July 13, 1926.  1,592,451
J. W. ENGHOLM
PASTEURIZING VALVE
Filed Oct. 8, 1925     2 Sheets-Sheet 1
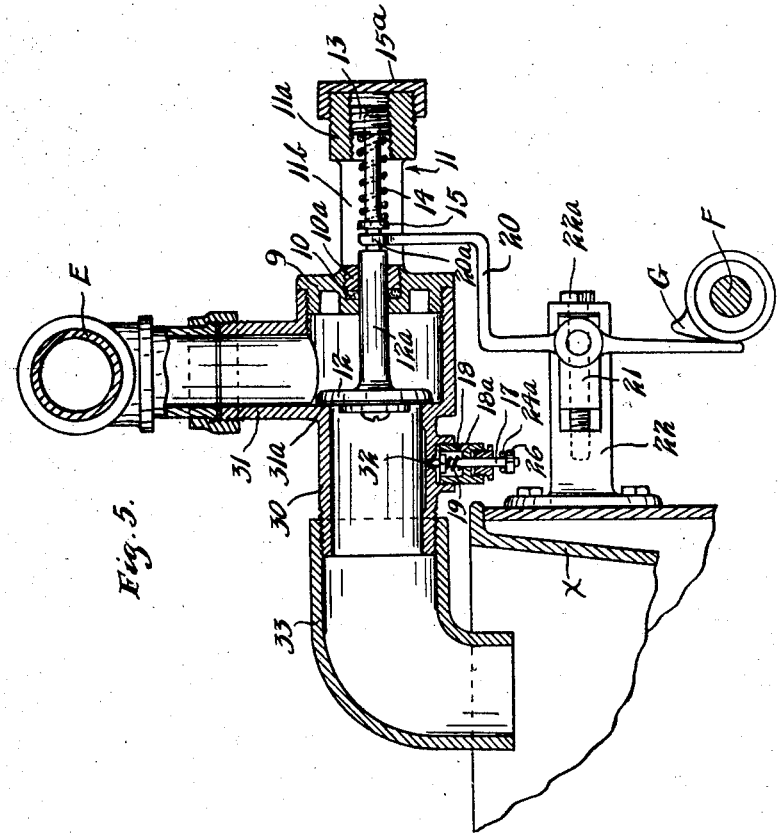
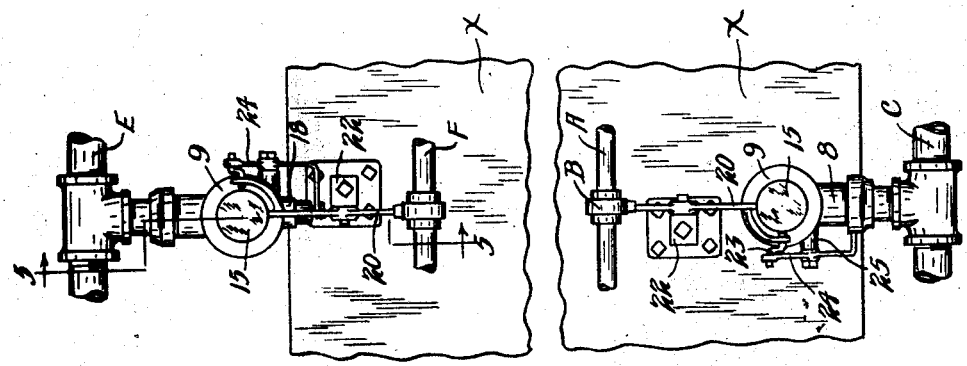
INVENTOR.
JOHN W. ENGHOLM.
BY HIS ATTORNEYS.

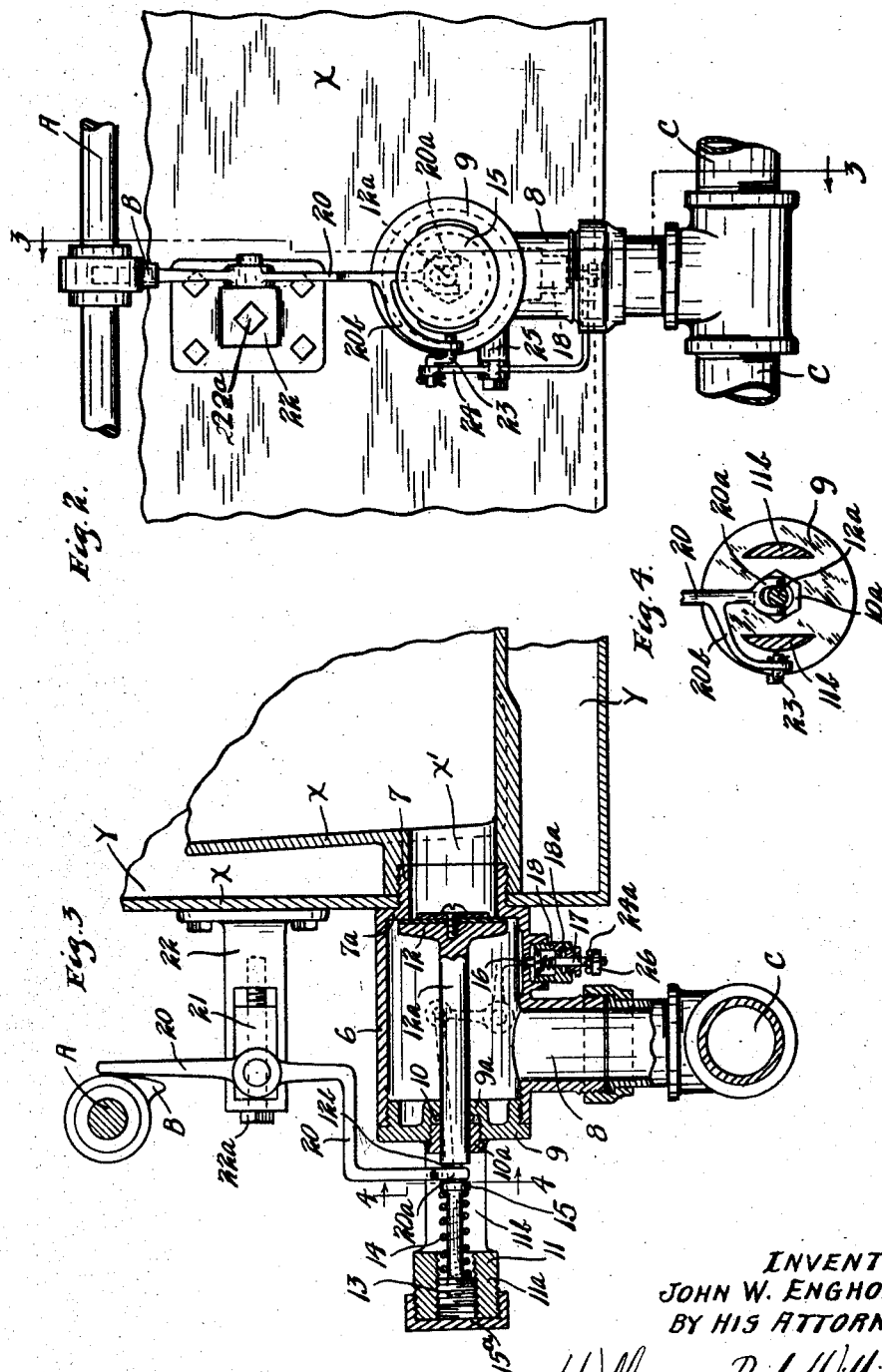

Patented July 13, 1926.

1,592,451

UNITED STATES PATENT OFFICE.

JOHN W. ENGHOLM, OF MINNEAPOLIS, MINNESOTA.

PASTEURIZING VALVE.

Application filed October 8, 1925. Serial No. 61,364.

This invention relates to valves especially adapted for "holding units" for Pasteurizing milk or other liquids. Standard holding units are made up of a plurality of separate compartments, each compartment of which is provided with an intake and outlet valve located at the top and bottom portions thereof, respectively. All of the inlet valves are operated by a cam shaft having thereon a series of cams so placed that they will operate the inlets in their proper sequence, while likewise the outlet valves are operated by another cam shaft timed properly with respect to the opening and closing of the inlets.

The main object of this invention is to provide an exceedingly simple but highly efficient valve which may be employed with slight change for either the inlets or outlets of the holding tanks having means for readily detecting leaks therein.

It is a further object to provide a Pasteurizer valve having leak-detecting means and having no working parts within the valve chamber except the head and smooth stem of a single puppet valve.

Another object of the invention is to provide such a valve capable of being readily attached and assembled and so constructed that ready access may be had to the entire valve chamber for cleaning.

A still further object is to provide such a Pasteurizer valve having a substantially cylindrical casing or chamber with a puppet valve seated therein and a relatively small leak-detecting valve closing a small leak outlet disposed on the outlet side of the main valve, the valve stems of said valves working through the sides of the casing whereby the opening and closing of the valves are controlled by means entirely without the valve chamber.

Another object of the invention is to provide in such a device means for closing one of said valves and opening the other substantially simultaneously, the leak-detecting valve being preferably closed, however, slightly before the main valve is opened.

These and other objects will be apparent from the following description made in connection with the accompanying drawings wherein like characters refer to similar parts throughout the several views and in which—

Fig. 1 is a fragmentary end elevation of a single holding compartment or tank in a Pasteurizer equipped with an inlet and an outlet valve embodying the preferred form of the invention;

Fig. 2 is an end elevation on an enlarged scale of the outlet valve;

Fig. 3 is a vertical section of the outlet valve taken on the line 3—3 of Fig. 2;

Fig. 4 is a cross section taken on the line 4—4 of Fig. 3; and

Fig. 5 is a vertical section of the inlet valve taken on the line 5—5 of Fig. 1.

While the inlet and outlet valves are substantially similar in structure and may be designed to employ the same castings, the dissimilar but corresponding parts of the two valves as illustrated will be numbered differently.

Referring to the outlet valve (see Figs. 2, 3 and 4), a substantially cylindrical casing 6 is provided having the threaded intake passage 7 adapted to be readily attached to the outlet port X' of a standard holding tank X. The letter Y indicates the water heating jacket disposed about the tank X in the holder unit. The casing 6 is open at its outer end and is also provided with an outlet passage 8 through one side, preferably the bottom thereof, connected to the outlet main C of the holding unit.

The open end of casing 6 is closed by a plug 9 having threaded engagement therewith and provided with a central sliding bearing $9^a$ and a threaded recess adapted to receive a packing washer 10 and a packing plug $10^a$. The plug 9 also carries a horizontally and outwardly projecting socket 11, preferably cast integral therewith, terminating in an apertured and threaded head $11^a$ and having a vertically slotted portion $11^b$ intermediate of said head and plug 9. A valve seat $7^a$ is provided about the intake passage 7 and a puppet valve 12, preferably horizontally aligned with passage 7, is adapted to close the passage through casing 6 having its stem $12^a$ slidably journaled in bearing $9^a$ and projected beyond the outer end of plug 9 through the socket 11 and into the apertured portion of the head $11^a$. A plug 13 is threaded into head $11^a$ having its inner end recessed to accommodate the outer extremity of valve stem $12^a$ and providing a seat for a coiled spring 14 bearing against an annular flange 15 formed in the intermediate portion of valve stem $12^a$. The valve 12 is thus normally held in closed position against seat 7ª by means of the coiled spring 14, the tension of which may be regulated by plug 13. A cap 15ª closes the outer end of head 11.

A relatively small leak outlet 16 is provided in the bottom of casing 6 forming on its outer side a seat for a small longitudinally projectable leak-detecting valve 17 working through the end of the valve housing 18 and normally projected into closed position by means of a coiled spring 19. A port 18ª in valve housing 18 permits the escapement of leakage therefrom.

A vertically swinging reciprocating lever 20, having an outwardly and downwardly extending end, is pivoted on an adjustable block 21 movable horizontally in the bracket 22 secured above casing 6 to the outer walls of the holder X. Block 21 is threaded to a bolt 22ª and held in a rectangular seat thereby rendered longitudinally adjustable. The upper straight end of lever 20 engages the cam B on the cam shaft A extending horizontally across one side of the holding unit and is obviously reciprocated by said cam. Shaft A is rotated intermittently by timing and driving mechanism not shown. The lower end of lever 20 terminates in a shipper fork 20ª working through slotted portion 11ᵇ of socket 11, adapted to engage an annular groove 12ᵇ in the intermediate portion of valve stem 12ª. An arcuate arm 20ᵇ is integral with and curves outwardly from the lower end of lever 20 working on the outer side of slotted portion 11ᵇ of socket 11 and is pivotally connected with a link 23 connected at its inner end to the upper arm of a bell crank lever 24 pivotally mounted on a boss 25 cast on the rear side of casing 6. The lower arm of bell crank lever 24 is bent outwardly and downwardly and then at right angles with the plane of the upper portion of the lever, terminating in a fork 24ª which engages an adjustable nut 26 carried by the lower end of valve 17. It will be noted that the fork 24ª engages only the nut 26, thereby being operative only to open valve 17 while the coiled spring 19 is employed to close the same.

The reciprocation of lever 20 and bell crank lever 24 connected thereto will obviously open the main valve and close the leak valve substantially at the same time and will, in turn, likewise permit the main valve to be closed and the leak valve to be opened.

The annular groove 12ᵇ on valve stem 12ª receiving the shipper fork 20ª is sufficiently wide to permit some play between the engagement of said two parts. In other words, the reciprocating lever 20, on its stroke to open the main valve 12 will move a short distance before the valve is unseated. This small movement is sufficient to actuate bell crank lever 24 to such an extent that the leak-detecting valve 17 will be seated before valve 12 starts to open. Thus the leak-detecting means is closed before the tank X begins to drain.

The length of the stroke of the reciprocating lever 20 may be varied by adjusting the block 21, as desired, in the bracket 22. Likewise the stroke of valve 17 may be regulated by changing the position of nut 26 on the outer end thereof.

The intake valve, disposed at the top of each section of the holding unit, is very similar to the outlet valve above described, with the exception that the parts are re-arranged to efficiently control the milk or liquid entering the holding unit. A valve casing 30 is provided, resembling casing 6 of the outlet valve but having its inlet passage 31 corresponding to the outlet passage of the outlet valve connected to the inlet main E of the holding unit. Inlet passage 31 communicates with, preferably, the top of casing 30. The outlet passage of this valve is connected to a bent conduit 33 adapted to deliver the milk or liquid into the top of one of the holding tanks X. In this inlet valve, the main valve seat 31ª is provided about the cylindrical valve chamber within casing 30. The leak-detecting outlet 32 is disposed on the outlet side of valve seat 31ª through the bottom of casing 30. The puppet valve employed to close the main passage, as well as the leak valve employed to close the leak-detecting outlet, and the means for operating said valves simultaneously are identical with the corresponding structure employed in the outlet valve previously described, and are accordingly indicated by the same reference characters. The reciprocating lever 20 of this valve is actuated by the cam G on the cam shaft F, which extends across one side of the holding unit and is rotated intermittently by means of driving mechanism, not shown.

*Operation.*

The operation of the inlet and outlet valves is practically identical and may be briefly summarized as follows:—

The controlling cam shaft A or F, as the case may be, is rotated through a fraction of a revolution at intervals, each movement causing one of the valves for the several holding tanks to be operated, thereby filling or emptying the respective tanks X, one at a time. When the cam has engaged reciprocating lever 20, the main valve 12 in the valve casing will be opened, while the leak-detecting valve 17 will be closed, the latter valve being actuated, as has been described, slightly before the main valve is affected. As soon as tank X has completely drained or filled, as the case may be, the controlling cam shaft will be rotated slightly and, with the cooperation of spring 14, the main valve will be closed, the leak-detecting valve 17 being simultaneously opened. It will be noted that a relatively small countersunk portion is provided in the bottom of the valve casing above the leak outlet adapted to collect any liquid leaking through the main valve.

When the tank is being filled, if there is a leak in the main outlet valve 12, the same will be indicated by a small flow of the liquid through the port 18ª of casing 18. Similarly, when the main inlet valve 12 is closed, the tank having been filled, a leak therein may be obvious. Since any liquid escaping from the main valve will be delivered through the leak-detecting valve, there will be no chance of raw milk being mixed with the Pasteurized milk having passed through the holding tank.

Merely by unscrewing the plug 9 in each of the valves, the entire valve chamber will be made accessible for cleaning or grinding the valve seat, in case that a bad leak has been detected. Thus, at the close of a daily run, the operator may quickly and simply clean the interior of the casing 6, as well as the stem and head of the puppet valve. It will be noted that the puppet valve 12 with its smooth head and stem is the only working part disposed within the casing 6 or 30. No springs, levers or other operating or closing means can, therefore, touch the milk either before or after the same is Pasteurized, while the structure makes it possible to regulate and operate all working parts from without the valve casing.

From the above description, it will be apparent that applicant has invented a simple but highly efficient Pasteurizing valve highly successful for all of the purposes intended.

It will, of course, be understood that various changes may be made in the form, details, proportions and arrangement of parts without departing from the scope of the invention.

What is claimed is:

1. A device of the class described having in combination a casing adapted to communicate with a liquid receptacle and having a passage therethrough, means for closing said passage, said casing comprising leak-detecting means for and in close proximity to said closing means through said casing and operating means disposed without said casing for rendering said leak-detecting means operative when said first mentioned means is inoperative and for rendering said leak-detecting means inoperative when said first mentioned means is operative.

2. A device of the class described having in combination a casing adapted to communicate with a liquid receptacle and having a horizontally extending passage therethrough, a main valve seat about said passage, a horizontally movable main valve, a leak detecting valve seat through the bottom of said casing on the outlet side of said main valve adjacent thereto, a substantially vertically movable leak detecting valve and means for operating said valve adapted to open said main valve and close said leak detecting valve and vice versa.

3. A device of the class described comprising a casing adapted to communicate with a liquid receptacle, having a passage therethrough and a leak detecting outlet communicating with said passage, longitudinally movable means for opening and closing said passage and longitudinally movable means for closing and opening said leak detecting outlet whereby said passage will be closed when said leak detecting outlet is open and vice versa and operating means without said casing for substantially simultaneously controlling said passage and outlet as set forth.

4. A device of the class described having in combination a substantially straight casing provided with inlet and outlet passages, a main valve seat about one of said passages, a leak-detecting valve seat in the bottom of said casing adjacent said main valve seat communicating with the interior thereof on the outlet side of said main seat, a valve for each of said seats and operating mechanism disposed without said casing for opening said main valve and closing said leak-detecting valve and vice versa.

5. The structure set forth in claim 4, and said valves having stems working longitudinally through the sides of said casing and said operating mechanism being connected with said stems on the outer side of said casing.

6. A device of the class described having in combination a casing provided with inlet and outlet passages, a main valve seat about one of said passages, a leak-detecting valve seat on the bottom of said casing communicating with the interior thereof at the outlet side of said main seat, longitudinally movable valves for each of said seats, resilient means without said casing for closing each of said valves and means without said casing co-operating with said resilient means to open one of said valves and close the other substantially as and for the purposes described.

7. The structure set forth in claim 6, said valves having stems working through the sides of said casing and a reciprocating lever without said casing having connections with said stems to open and close said valves substantially as described.

8. The structure set forth in claim 6 and means for varying the length of the stroke of said main valve.

9. The structure set forth in claim 6 and means for varying the stroke of said leak-detecting valve.

10. The combination with a rotary cam shaft of a casing adapted to communicate with a liquid receptacle and having a passage therethrough provided with leak-detecting means, a valve adapted to open and close said passage and a second valve adapted to operate said leak-detecting means, said valves having stems working through the sides of said casing, a lever reciprocated by said cam shaft having connections with the outer ends of said valve stems whereby one of said valves will be opened and the other closed intermittently, substantially as described.

11. A device of the class described having in combination a substantially cylindrical casing adapted to communicate with a liquid receptacle and provided with a passage through one side thereof and a second passage in one end thereof, a valve seat intermediate said passages, a removable plug in said casing aligned with said valve seat, a longitudinally movable valve adapted to engage said valve seat and having a stem slidably journalled through said plug, said casing also having a leak-detecting aperture through the bottom thereof disposed at the outlet side of said valve seat, a longitudinally projectable valve adapted to close said aperture and reciprocating means without said casing for opening said main valve and closing said leak-detecting valve and vice versa substantially as described.

12. A device of the class described having in combination a casing provided with a passage therethrough, a relatively small leak-detecting outlet communicating with said passage, a valve for opening and closing said passage having a stem working through a side of said casing, a second valve for opening and closing said leak-detecting outlet having its stem also working through a side of said casing and means without said casing for jointly operating said valves whereby said leak-detecting valve will be closed slightly before said main valve is opened and said leak-detecting valve will be opened approximately when said main valve is closed.

13. A device of the class described having in combination a casing adapted to communicate with a liquid receptacle having a passage therethrough, and a leak-detecting outlet communicating with said passage, valves for closing said passage and said outlet having stems working through the sides of said casing, a reciprocating lever without said casing having an arm connected with said passage closing valve and a bell crank lever connected with said reciprocating lever and with said leak-detecting valve whereby when one of said valves is opened, the other will be closed.

14. A device of the class described having in combination a casing adapted to communicate with a liquid receptacle and having a passage therethrough, a main valve seat about said passage, a leak detecting valve seat through the bottom of said casing, adjacent said main valve seat, longitudinally movable valves for each of said valve seats, means without said casing for operating said main valve and means also without said casing for operating said leak detecting valve.

15. The structure set forth in claim 14 and said casing having a concave portion on the inner side about said leak detecting valve seat.

In testimony whereof I affix my signature.

JOHN W. ENGHOLM.